(12) United States Patent
Dominguez et al.

(10) Patent No.: US 7,841,218 B2
(45) Date of Patent: Nov. 30, 2010

(54) WASHING MACHINE CLUTCH SYSTEM

(75) Inventors: Jose Higinio Sanchez Dominguez, Queretaro (MX); Giancarlo Hazael Paez Gonzalez, Nuevo Leon (MX); Raul Santillan Galvan, Michoacan (MX); Jorge Vega Trejo, Queretaro (MX); Javier Pena Aguilar, Queretaro (MX)

(73) Assignee: MABE Mexico, S. DE R.L. DE C.V., Queretaro, QRO (MX)

( * ) Notice: Subject to any disclaimer, the term of this patent is extended or adjusted under 35 U.S.C. 154(b) by 336 days.

(21) Appl. No.: 12/040,226

(22) Filed: Feb. 29, 2008

(65) Prior Publication Data

US 2008/0216521 A1 Sep. 11, 2008

(30) Foreign Application Priority Data

Mar. 8, 2007 (MX) .................. MX/A/2007/002852

(51) Int. Cl.
*D06F 37/40* (2006.01)
(52) U.S. Cl. ....................................... 68/12.24; 68/133
(58) Field of Classification Search .................. 68/132, 68/133
See application file for complete search history.

(56) References Cited

U.S. PATENT DOCUMENTS

| | | | | | |
|---|---|---|---|---|---|
| 1,964,440 | A | * | 6/1934 | Patch | 68/133 |
| 1,971,980 | A | * | 8/1934 | Hitchcock | 74/75 |
| 2,048,306 | A | * | 7/1936 | Waterworth | 210/360.1 |
| 2,511,104 | A | * | 6/1950 | Eddy | 235/103.5 R |
| 2,526,969 | A | * | 10/1950 | Powers | 68/23.7 |
| 2,681,557 | A | * | 6/1954 | Auguste | 68/23 R |
| 2,690,825 | A | * | 10/1954 | McWethy | 192/56.42 |
| 2,699,682 | A | * | 1/1955 | Castner | 74/70 |
| 3,153,951 | A | * | 10/1964 | Whelan | 74/665 K |
| 3,740,975 | A | * | 6/1973 | Cornelius | 68/18 F |
| 4,155,228 | A | | 5/1979 | Burgener et al. | |

(Continued)

FOREIGN PATENT DOCUMENTS

GB 1420081 1/1976

(Continued)

*Primary Examiner*—Frankie L Stinson
(74) *Attorney, Agent, or Firm*—Enrique J. Mora, Esq.; Beusse, Wolter, Sanks, Mora & Maire, P.A.

(57) ABSTRACT

A washing machine clutch to rotate or oscillate an agitator or propeller and selectively rotate a basket, comprising a support member that contains a cover and a second cover, an actuator that contains a piston, a bracket that contains a lever joined to arms, terminals and a protuberance, wherein the terminals and the protuberance are in said arms, a first spring connected between said support member and said bracket, a hollow shaft and a shaft configured to rotate, a mobile clutch containing an upper wall, a groove an internal part and a lower wall, wherein said terminals rest in the groove and in said upper wall, wherein the lower wall contains a plurality of alternating teeth and grooves and wherein the mobile clutch is coupled to the hollow shaft by its internal part, a pulley-clutch containing a plurality of alternating teeth and grooves, and an internal part, wherein the pulley-clutch is coupled to the shaft by means of said pulley-clutch internal part, wherein the mobile clutch couples with the pulley-clutch by means of the activation of said actuator, allowing the arm, terminal, protuberance and mobile clutch movement.

8 Claims, 6 Drawing Sheets

U.S. PATENT DOCUMENTS

| | | | |
|---|---|---|---|
| 4,291,556 | A | 9/1981 | Mason |
| 4,969,341 | A | 11/1990 | Burk et al. |
| 5,172,573 | A | 12/1992 | Sharp et al. |
| 5,586,455 | A | 12/1996 | Imai et al. |
| 5,842,358 | A | 12/1998 | Koo et al. |
| 5,860,299 | A | 1/1999 | Eum et al. |
| 5,873,269 | A | 2/1999 | Hong et al. |
| 5,884,507 | A | 3/1999 | Lee et al. |
| 6,148,646 | A | 11/2000 | Koshiga et al. |
| 6,176,108 | B1 | 1/2001 | Bae et al. |
| 6,318,133 | B1 | 11/2001 | Koshiga et al. |
| 6,332,343 | B1 * | 12/2001 | Koketsu et al. ............ 68/23.7 |
| 6,546,762 | B2 | 4/2003 | Koshiga et al. |
| 6,740,714 | B2 | 5/2004 | Kratschmer et al. |
| 6,907,971 | B2 | 6/2005 | Demir et al. |
| 7,082,792 | B2 | 8/2006 | Ahn |
| 7,086,254 | B2 | 8/2006 | Lim et al. |
| 7,089,769 | B2 | 8/2006 | Lim et al. |
| 7,171,715 | B2 | 2/2007 | Yoon et al. |
| 7,454,929 | B2 * | 11/2008 | Cho et al. ............ 68/133 |

FOREIGN PATENT DOCUMENTS

| | | | |
|---|---|---|---|
| JP | 2000-271387 | * | 10/2000 |
| JP | 2001-113285 | * | 4/2002 |
| WO | WO 02066725 | | 8/2002 |

* cited by examiner

WASHING MACHINE CLUTCH SYSTEM

RELATED APPLICATIONS

This application claims priority from Mexican application Serial No. MX/a/2007/002852 filed Mar. 8, 2007, which is incorporated herein by reference in its entirety.

FIELD OF THE INVENTION

The present invention refers to driving systems for automatic washing machines, and particularly to clutches and their incorporation to vertical axis washing machines having a drive system.

PRIOR ART DESCRIPTION

A washing machine is an apparatus which makes a water flow in a tub and basket by means of mechanical forces. The washing machine provides mechanical actions to apply a physical operation, such as friction, impact and similar, to textiles during the washing operation improving the washing effect in a short time period. An automatic washing machine, makes the washing, rinsing and dehydrating processes.

Such vertical axis washing machines have propellers or agitators, as well as drive apparatuses to drive the basket and agitator or propeller. The propeller or agitator operates to form a water flow or agitate the cloth within the basket during washing operation. Later, the basket is driven to apply centrifugal force to the cloth being washed, during the centrifugal cycle. The drive of the basket, includes a motor to generate a pushing power, a clutch mechanism and shafts to transmit the drive or pushing power to the propeller or agitator and/or basket.

In a conventional washing machine, the motor and clutch mechanism are connected by means of belts and pulleys. An internal shaft of the propeller or agitator, is coaxial with the rotation axis of the propeller or agitator, wherein the internal shaft of the propeller or agitator and the clutch assembly are in the same axis, thus avoiding vibration and noise problems.

There are several alternatives to the above mentioned solution, that is, coaxial alignment between the drive shaft of the motor with the rotation axis of the propeller or agitator. The above mentioned, has as a result an indirect drive system between the motor and the propeller or agitator, and the motor and the basket, so that the washing machine can selectively operate between an agitation mode, wherein the agitator or propeller are oscillated, preferably in a clock-wise direction, meanwhile the basket is semi-fixed by means of an unidirectional ball bearing, and in a dehydration mode, wherein the agitator or propeller and the basket are rotated together.

Conventionally, washing machines using this drive system incorporate a spring clutch or toothed clutch and a solenoid to actuate the clutch, moving the clutch member vertically with regard to the motor, to engage or disengage the driving connection with the basket.

With respect to the latter type of clutches, that is, splined clutches, those known in prior art are usually complicated mechanisms that require precisely machined and died surfaces and complicated actuation mechanisms. The complexities of said arrangements, results in relatively expensive and unreliable engagement devices.

Several documents disclose these type of clutches. For example, U.S. Pat. No. 6,907,971 discloses a one-way clutch assembly comprises a clutch casing including a first plate coupled to a second plate, such as clutch inner and clutch outer plates. U.S. Pat. No. 6,176,108 discloses motor-clutch assembly of a direct engagement type washing machine. U.S. Pat. No. 5,884,507 discloses a washing machine includes a water tub, a spin basket mounted inside the water tub, and a pulsator mounted in the spin basket. A drive transmission includes a hollow dehydrating shaft and a laundering shaft disposed coaxially therein. The hollow dehydrating shaft is connected to the spin basket, and the laundering shaft is connected to the pulsator. U.S. Pat. No. 5,873,269 discloses a dehydrating shaft is fixed to the spin basket, and a laundering shaft extends coaxially within the dehydrating shaft. U.S. Pat. Nos. 5,860,299 and 5,842,358 disclose a similar disposition to the afore-mentioned U.S. Pat. No. 5,873,269. U.S. Pat. No. 5,586,455 discloses a washing machine including a float-clutch that has external teeth.

U.S. Pat. No. 5,172,573 discloses a clutch mechanism for the drive system of an automatic washer having a concentrically mounted wash basket, and a motor drivingly connected to the agitator to drive the basket. The clutch mechanism includes a first clutch member drivingly connected to the motor, and a second clutch member drivingly connected to the wash basket and selectively axially actuable for driving engagement with the first clutch member. Opposing engagement surfaces of the clutch members are provided with alternating radially extending splines and grooves having a generally saw-tooth profile. The splines of one of the clutch members are provided with squared tips, and the grooves of the other clutch member are provided with squared recesses, so that the shape of the corresponding splines and recesses provide an easily achieved yet secure connection when the clutch members are drivingly engaged. The splines and grooves are so configured to provide clearance for smooth engagement without regard to small variations in tooth size or misalignment, and is such that rattling during steady state spin operation is eliminated.

U.S. Pat. No. 4,969,341 also discloses a similar clutch mechanism. However, in comparison to U.S. Pat. No. 5,172,573, U.S. Pat. No. 4,969,341 provides a combination of toothed and squared splines. The problem found with the above is that during the engagement of the clutch plate with the second plate, collision between the splines, the clutch means and the complementary groove of the other clutch means may occur, that during centrifuge operation may cause strong vibrations to the washing machine.

U.S. Pat. No. 4,291,556 discloses a transmission shift mechanism for use in a vertical axis automatic washing machine having reversible rotary drive means has a drive gear on which is mounted an eccentric for translating rotary motion into oscillatory motion in a plane perpendicular to the washing machine axis. U.S. Pat. No. 4,155,228 discloses a vertical-axis, automatic washing machine has a central drive shaft for driving in an oscillatory manner a first agitator portion with a clutch member splined thereto.

Other patents to consider as know techniques in the art are U.S. Pat. Nos. 3,433,337, 3,314,257, 2,869,700, 2,675,898, 2,398,570, 1,817,660 and 1,694,810.

Finally British patent No. 1 420 081 discloses a clutch with splined teeth.

None of the prior art documents, show a trustworthy, economical and simple manner to provide clutches with splines in washing machines. Therefore, it would be an improvement in the art, to provide a trustworthy, economical, and simple clutch arrangement to switch from agitating mode to centrifugal mode in a washing machine.

One of the problems found in the art, is the faultiness to engage the splines, that is the lack of force between both clutch system plates. This force is commonly given by springs or other members with similar features, however has been found that these are non-reliable.

BRIEF DESCRIPTION OF THE PRESENT INVENTION

The present invention contemplates a clutch mechanism that is actuated by an actuator for use in washing machines that have an agitator or propeller in a vertical axis, a concentrically mounted basket, a motor that is connected to the agitator or propeller by means of pulleys and belts, to selectively oscilate4 or rotate the agitator or propeller in a vertical axis. The clutch mechanism connects the agitator or propeller with a pulley-clutch by means of a shaft, wherein the pulley-clutch is connected to the motor by means of the pulley integrated with the pulley-clutch and a belt, for rotation or oscillation of the agitator or propeller during wash cycle. Additionally, the clutch mechanism selectively allows the connection between the pulley-clutch, with a mobile clutch, which is connected to the basket by means of a hollow shaft, for simultaneous rotation of the agitator or propeller and the basket during centrifugal cycle.

The clutch mechanism includes the mobile clutch and the pulley-clutch, the mobile clutch being mounted to rotate the hollow shaft or basket shaft, consequently rotating the basket, and selectively actuating to be engaged with the pulley-clutch. The pulley-clutch being connected to rotate or oscillate the shaft or agitator shaft, consequently, rotating or oscillating only the agitator or propeller. Engaged, the mobile clutch with the pulley-clutch, rotate both the basket and the agitator or propeller in a synchronized manner.

A support member, which, along a switching bracket and actuator, actuate the mobile clutch, and stores the actuator, transmitting a force provided by the actuator by means of the switching bracket to the mobile clutch so it engages with the pulley-clutch. The support member is, at the same time, supported by a fixing member, which is connected to the washing machine tub base.

The support member additionally includes a first spring, that connects and regulates the movement between the first support member with the switching bracket, wherein the first spring tends to separate the mobile clutch from the pulley-clutch to disengage them. The first spring may be any elastic member in general, and is not limited to springs. The disengaged position of the clutches allows a minimal effort position of the first spring. The first spring makes a constant force trying to return to its rest position, and when the system allows it, pulls the bracket allowing that the clutch mechanisms disengage. With the afore-mentioned, a lack of disengagement failure is achieved, since by means of the first spring, disengagement is assured at all time of the engagement mechanisms. Additionally, the actuator has enough force to beat the first spring and allow engagement of the clutch mechanisms, achieving a lack of engagement failure once the actuator exerts drive force to the bracket. The actuator used in the invention, is preferably a thermo-actuator.

The mobile clutch and the pulley-clutch have opposing surfaces, wherein each surface contains a plurality of teeth or splines and grooves in an alternating manner. During the engagement and disengagement of the mobile clutch with the pulley-clutch, the splines of each one of the clutches are received in the grooves of the opposing clutch.

Preferably, the form in the upper part of the splines of the mobile clutch, are triangular with the upper part of the triangle being rounded or flat. The form of the lower part of the splines of the mobile clutch, are rectangular form with exploded inner corners. The upper part and the lower part are the same piece. On the other hand, the pulley-clutch grooves form are rectangular, with exploded lower corners.

The splines of the pulley-clutch are similar to those of the mobile clutch, while the grooves of the mobile clutch are similar to the pulley-clutch.

Therefore, one of the objects of the present invention is to provide a clutch mechanism that may be trustable, and that during engaging and disengaging time, the mechanism may be trustable.

Another object of the present invention is providing a better engagement of the clutch with greater actuation force to that known. Likewise, a further object is providing a better disengagement with greater actuation force to that known.

Yet a further object of the invention is providing a clutch system that has lower cost, by means of materials and clutch system assembly.

A further object of the invention is that the splines allow a homogenous contact between the power transmission surfaces, that is, between the clutches, reducing necessary force. Likewise, given its geometry, the clutches may be manufactured in non-costly materials, such as plastic. The rounded tip of the upper part of the splines, also has the object of facilitating the manufacture and function of engagement and disengagement.

Yet a further object of the present invention reducing the sound levels and eliminating shock absorbing elements of the art by means of used materials.

Further objects and advantages of the present invention will become apparent when the specification is referenced, taking into account the following figures.

BRIEF DESCRIPTION OF THE FIGURES

The particular features and advantages of the invention, as well as other objects of the invention, will become apparent from the following description, taken in connection with the following figures, of which.

DETAILED DESCRIPTION OF THE INVENTION

Figure 1:
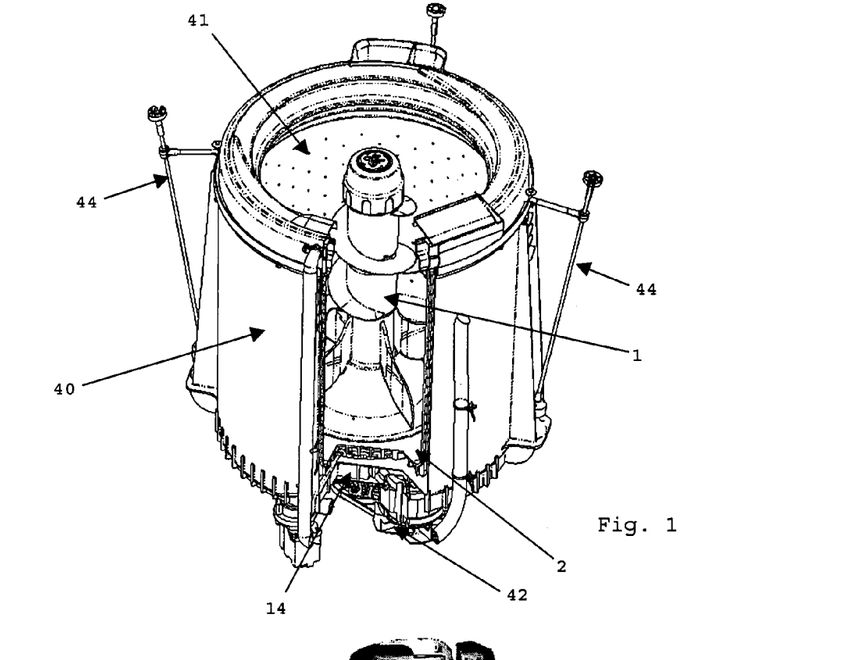
FIG. 1 is a conventional perspective view with a tub and basket cut of the washing machine of the present invention.

FIG. 1 is a conventional perspective view of a tub (40) and basket (41) cut of the washing machine of the present invention. The basket (41) is found within a tub (40). In the upper part of the tub (40) and basket (41), usual washing machine components may be found, such as a tub cover, deflecting means, dispatching boxes, etc. Above the bottom (2) of the basket (41), that is, in the upper part of the bottom (2) of the basket (41), and centered in regard to said basket (41), an agitator or propeller (1) may be found, to agitate the textiles found within the basket (41). Connected to the lower part of the tub (40) by means of a support system (14) a drive system assembly (42) is found, usually formed by a motor (27), a belt (28) and pulleys, as well as a clutch system (43) usually formed by shafts (11, 12) and clutches to transmit the power provided by the motor (27) to the agitator or propeller (1) and the basket (41) respectively.

The tub (40) and its included components are found joined to a washing machine cabinet, by means of a suspension rod (44).

Figure 2:
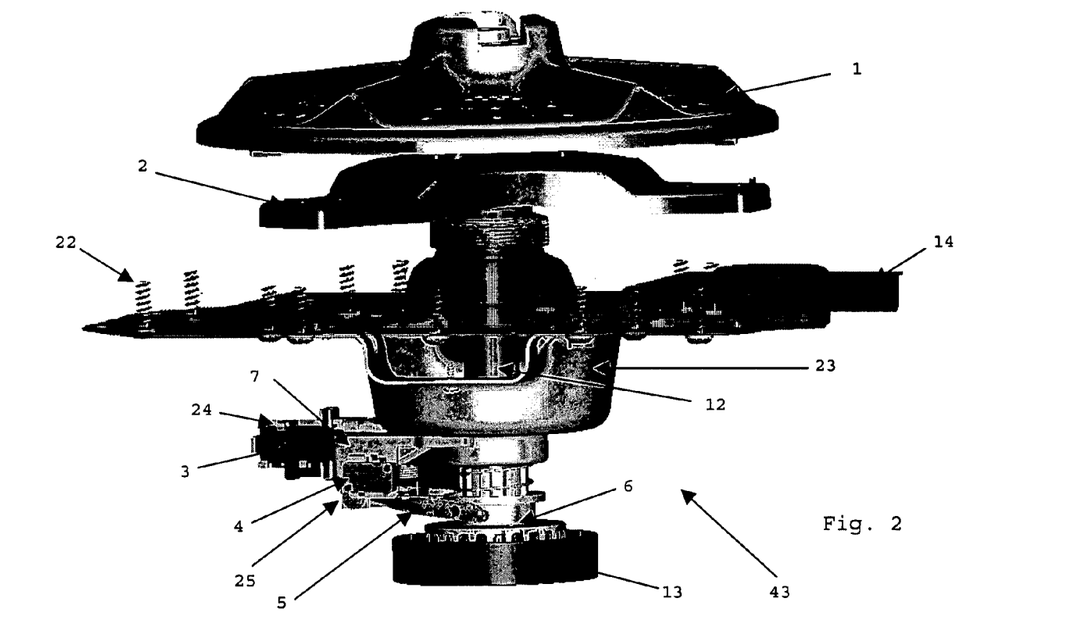
FIG. 2 is an exploded perspective view of the clutch system components of the present invention.

FIG. 2 shows the components in an exploded view of the clutch system (43) of the present invention.

Said figure shows a propeller (1), however, the clutch system (43) of the present invention, is capable of working with an agitator as shown in FIG. 1.

The support (14) of the clutch system (43), which is shared with the drive system assembly (42), is fixed in the lower part of the tub (40) by fixing means (22), which are preferably, however not limited to, fixing screws.

To the system support (14), a fixing member (23) is connected by said fixing means (22), which supports a support member (7) which is parallel to the system support (14). In one of its ends, the support member (7) contains a housing (24) to house an actuator (3).

In the lower part of the support member (7) a second cover (25) is found, to house a switching bracket (5). The parts of the switching bracket (5) will be discussed with greater detail below. The support member (7) also supports the limit contact (4).

Figure 3:
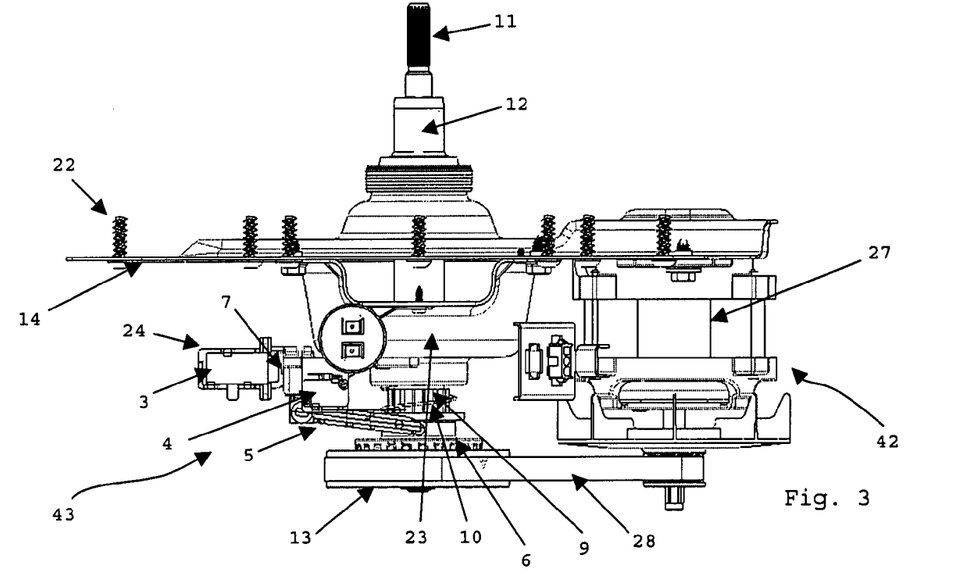
FIG. 3 is a right lateral view of the drive system and the clutch system of the present invention.

FIG. 3 is a lateral right view of the drive system assembly (42) and the clutch system (43). The clutch system (43) contains a mobile clutch (6) and a pulley-clutch (13). The pulley-clutch (13) is connected to the motor (27) by means of pulleys and belts (28).

The mobile clutch (6) is found connected to a hollow shaft (12) by means of an insert (9). At the same time, the hollow shaft (12) is connected to the bottom (2) of the basket (41), and consequently to the basket (41). The hollow shaft (12) with the insert (9), by means of the belts (28), the mobile clutch (6), and the pulley-clutch (13), transmits the generated force by the motor (27) to the basket (41) of the washing machine.

The pulley-clutch (13) is found connected to a shaft (11), which by means of the belts (28) and the pulley-clutch (13), transmits the power generated by the motor (27) to the agitator or propeller (1).

Between the mobile clutch (6) and the fixing member (23), surrounding the insert (9) the hollow shaft (12), a second spring (10) is found, pushing the mobile clutch (6) towards the pulley-clutch (13). The second spring (10) may be any type of elastic member. The insert (9) is fixed and embracing the hollow shaft (12). The mobile clutch (6) is guided with the insert (9), by means of straight teeth splines (29) that the insert (9) has in its external part, as well as straight teeth splines in the interior part of the mobile clutch (6), coinciding with the straight teeth splines (29) of the insert (9).

The shaft (11) goes through the longitude of the hollow shaft (12), through its hollow interior part, however, both shafts (11, 12) have an independent turn between themselves. The pulley-clutch (13) is connected to the shaft (11), by means of splines (39) that the end of the shaft (11) has in its external part, as well as splines (39) in the interior part (38) of the pulley-clutch (13), coinciding with the splines (39) of the end of the shaft (11).

While the shaft (11) is allowed a counter-clockwise and clockwise movement, the hollow shaft (12) is only allowed movement in a single sense, since a ball bearing (not shown) blocks the movement of the basket in one of the two senses, preferably counter-clockwise.

Figure 4:
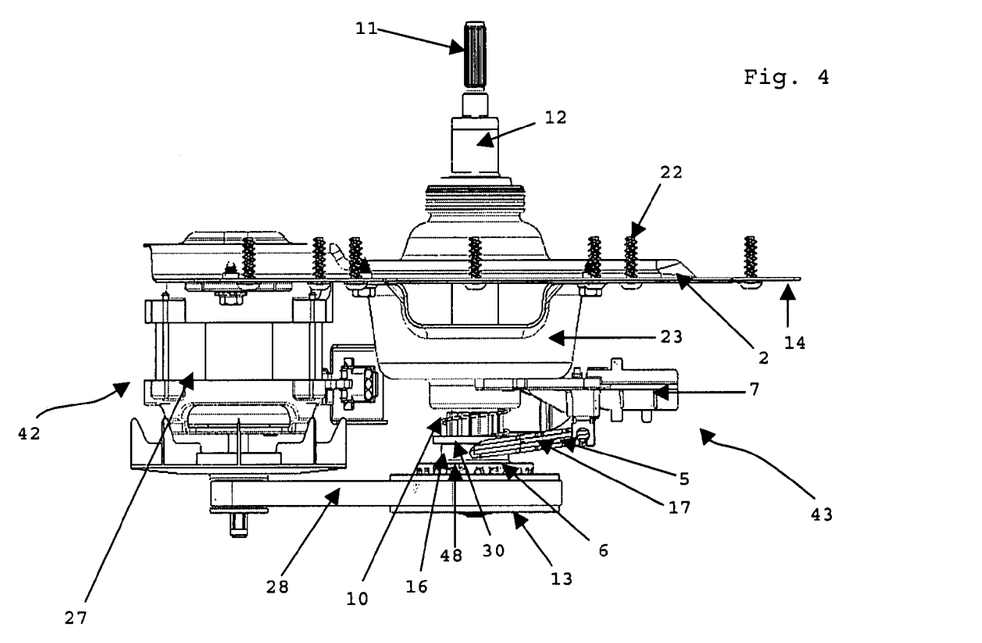
FIG. 4 is a left lateral view of the drive system and clutch system of the present invention.

FIG. 4 is a left lateral view of the clutch system (43) and the drive system assembly (42). In FIG. 4, the mobile clutch (6) may be observed, which is constituted by a groove (16), which is delimited by an upper wall (30) and a lower wall (48), wherein the lower wall (48) contains a plurality of teeth (33) and grooves (34) in its lower part. Additionally, the back part of the support member (7) may be seen, as well as the housing (24) for the actuator (3).

The belts (28) and pulleys coming from the motor (27) are fixed only to the pulley-clutch (13) that transmits the power, by means of the shaft (11), to the propeller or agitator (1).

Figure 5:
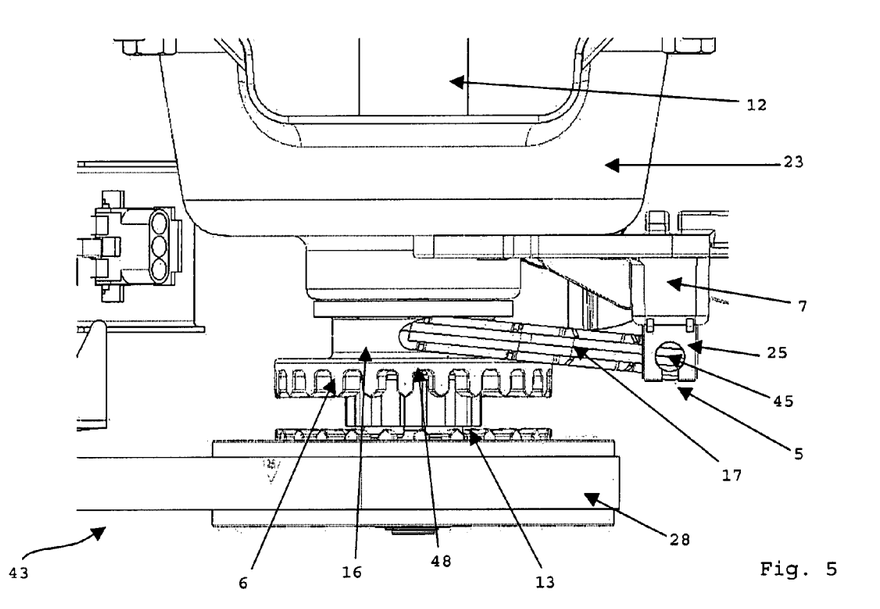
FIG. 5 is a detailed left lateral view of the clutch system components, the clutches being in a disengaged position.

FIG. 5 is a detailed left lateral view of the clutch system (43) components, in disengaged position. In the upper part of the mobile clutch (6), the groove (16) is found, which is uniform along the circumference of the mobile clutch (6), wherein arms (17) of the switching bracket (5), by means of semi-cylindrical terminals (19) in each arm (17), rest. The terminals (19) of the arms (17) are in contact and fixed with the upper wall (30) of the groove (16) of the mobile clutch (6) when the clutches (6, 13) are disengaged.

The mobile clutch (6) and the pulley-clutch (13) are found in the same axis, as well as the hollow shaft (12) and the shaft (11). The hollow shaft (12) and the shaft (11) go through the fixing member (23) by means of a hole that the fixing member (23) has in its central part. The belts (28) are the indirect connection between the motor (27) and the clutch system (43).

The switching bracket (5) is fixed to the support member (7) by means of second cover (25) of the support member (7) and a pivot (45) of the bracket (5).

Figure 6:
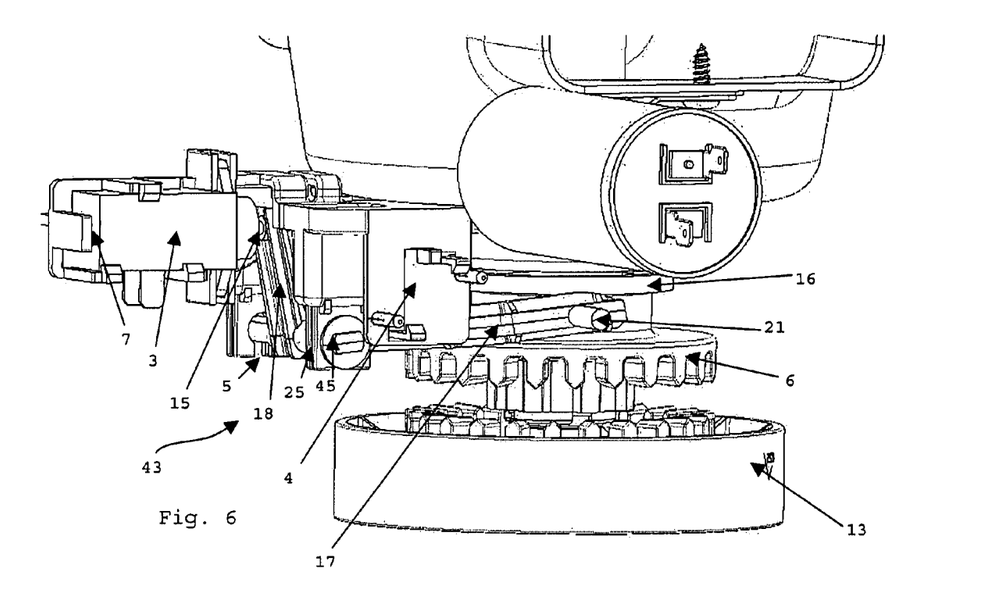
FIG. 6 is a detailed right-back-lateral view of the clutch system components of the present invention.

FIG. 6 shows a detailed back-right-lateral view of the clutch system components. The bracket (5) contains a lever (18) that will be pushed by the piston (15) of the actuator (3), consequently pushing the arms (17) and terminals (19), since none of the pieces of the bracket (5) are independently movable. The arms (17) and terminals (19) of the switching bracket (5), with respect to the lever (18) of the bracket (5), are found at a 75° to 120° angle.

In the corresponding time, the actuator (3) is activated by means of electricity. When electricity is transmitted to the actuator (3), an internal resistance is created, generating heat within the actuator (3), making a displacement of piston (15) towards the outside of the actuator (3). The piston (15), during its displacement to the outside, starts pushing the lever (18) of the switching bracket (5). Since all the parts of the switching bracket (5) are dependent, the arms (17), terminals (19) and a protuberance (21) are moved along with the lever (18).

The lever (18) and arms (17) of the switching bracket (5) are found at an angle between themselves, and are joined by means of the pivot (45). When the piston (15) is displaced towards the outside of the actuator (3), it pushes the lever (18) in a co-lineal axis with the piston (15), causing the run of said lever (18) in a circular segment with angle β that is in function of the pistons (15) run, starting from the moment said piston (15) enters in contact with the lever (18), running a secant distance $S_1$ of said circular segment. The circular segment has its center in the pivot (45) and has a radius equal to the length of the lever (18) measured from the pivot (45).

Likewise, in view that the arms (17) have a greater longitude than the lever (18), to multiply the force applied by the force of the piston (15) and thanks to the push of the piston (15), that same angle β will be run by the arms (18), measured from its initial to final position, describing a greater circular segment and thus the distance of secant $S_2$ run by the arms (17) is greater than the secant $S_1$ run by the lever (18).

The afore-mentioned movement will be called here-on-forth lever angular displacement.

The lever angular displacement of the arms (17), is reflected on the terminals (19) and protuberance (21), which allows the lift of the arms (17) and terminals (19).

The arms (17) of the switching bracket (5), by means of the semi-cylindrical terminals (19) in each arm (17) rest in the groove (16) of the mobile pulley (6). The arm (17) terminals (19) are in contact and fixed with the upper wall (30) of the groove (16) of the mobile clutch (6).

Since the mobile clutch (6) is constantly being pushed towards the pulley-clutch (13) by the second spring (10), and since the arm (17) terminals (19) are in contact with the upper wall (30) of the groove (16) of the mobile clutch (6), they start descending, allowing the descendant vertical movement of the mobile clutch (6) and thus allowing, the second spring (10) to arrive to a minimal effort state.

A tappet (20) of the contact switch (4) rests over a protuberance (21) of the switching bracket (5). The protuberance (21) comes from the arms (17) of the switching bracket (5), thus while the arms (17) are descending with the lever angular displacement, the movement is also reflected in the tappet (20) of the contact switch (4), however this movement is not an angular displacement.

Figure 7:
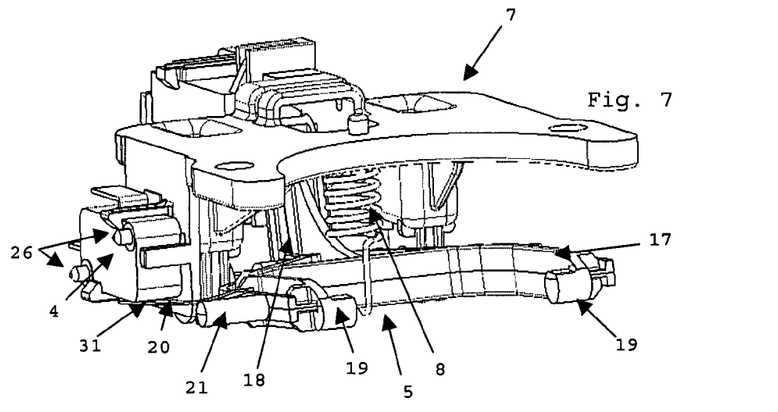
FIG. 7 is a front lateral view of the support member and switching bracket of the present invention.

In FIG. 7 the relation between the support member (7) and the bracket (5) may be seen in detail. The support member (7) and the switching bracket (5) house a first spring (8), that is connected between the said support member (7) and said switching bracket (5). The first spring (8) connects and regulates the movement between the support member (7) and the switching bracket (5).

Figure 8:
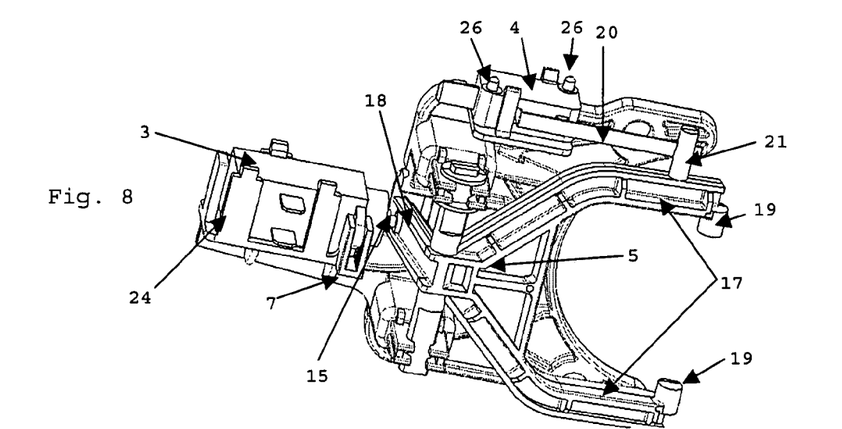
FIG. 8 is a lateral-lower view of the support member and the switching bracket of the present invention.

In FIG. 8 the relation between the support member (7) and the bracket (5) may be seen in a lower view. The bracket (5) is found in the lower part of the support member (7). The piston (15) of the actuator (3) pushes the lever (18) of the bracket (5). This displacement is generated by the piston (15) of the actuator, will be reflected in the angular displacement of the arms (17), terminals (19) and protuberance (21) of the bracket (5).

While the arms (17), terminals (19) and protuberance (21) of the switching bracket (5) are angularly displaced, said tappet (20) by means of the protuberance (21) is also moved without being angularly displaced.

The contact switch (4) is fixed to the support member (7) by means of ends (26) of the support member (7). The contact switch (4) has a pair of holes, through these holes, the contact switch is inserted in said ends (26) of the support member (7).

The contact switch (4) additionally has a switch (31) in which, once the leva (20) is at a certain position along its movement, it allows energizing or de-energizing a motor phase (27), thus not allowing the motor being energized, and thus not giving drive until the clutches (6, 13) are engaged, so that the washing machine may initiate centrifugal phase.

The actuator (3) is controlled by means of a control (not shown), which activates or de-activates said actuator (3) displacing towards the outside or inside the piston (15). In this embodiment, the control switch (4) is not related with the control, rather the motor (27) and the function of the control limit (4) and actuator (3) is totally independent.

In a further embodiment, when the tappet (20) has reached a certain position in the vertical plane, by means of the switch (31), a signal is sent to the control and indirectly to the motor (27). The control energizes the actuator (3), displacing the piston (15) until the switch (31) sends a signal to the control and this at its time, energizes the motor (27), thus driving, so that the washing machine may start the centrifugal phase.

Finally in a further embodiment, when the piston (15) of the actuator (3) reaches the end of its run, the contact switch (4) sends a signal to the control, and in parallel to a relay or similar mechanism, it allows the current flow towards the motor (27) phase, so that it may be energized thus driving and initiating the centrifugal phase.

Figure 9:
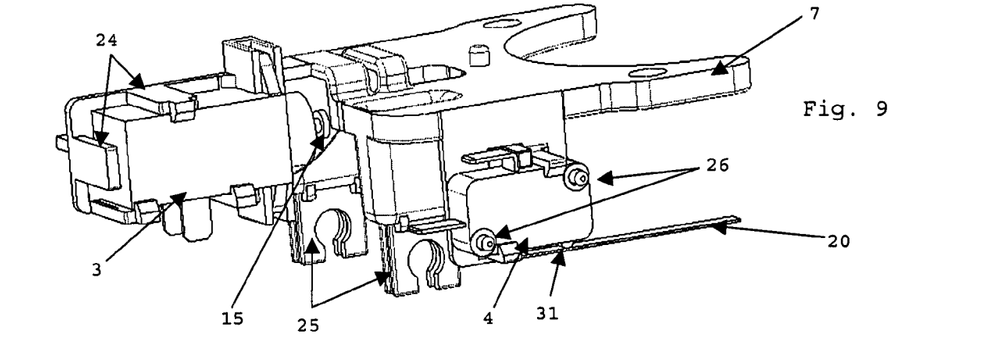
FIG. 9 is a conventional perspective right lateral view of the support member of the present invention.

FIG. 9 shows the support member (7) without the bracket (5). The covers (25) house the bracket (5) in a movable relation with regards to the support member (7). The housing (24) or support member (7), houses the actuator (3) and its piston (15).

Figures 10, 11, 12:
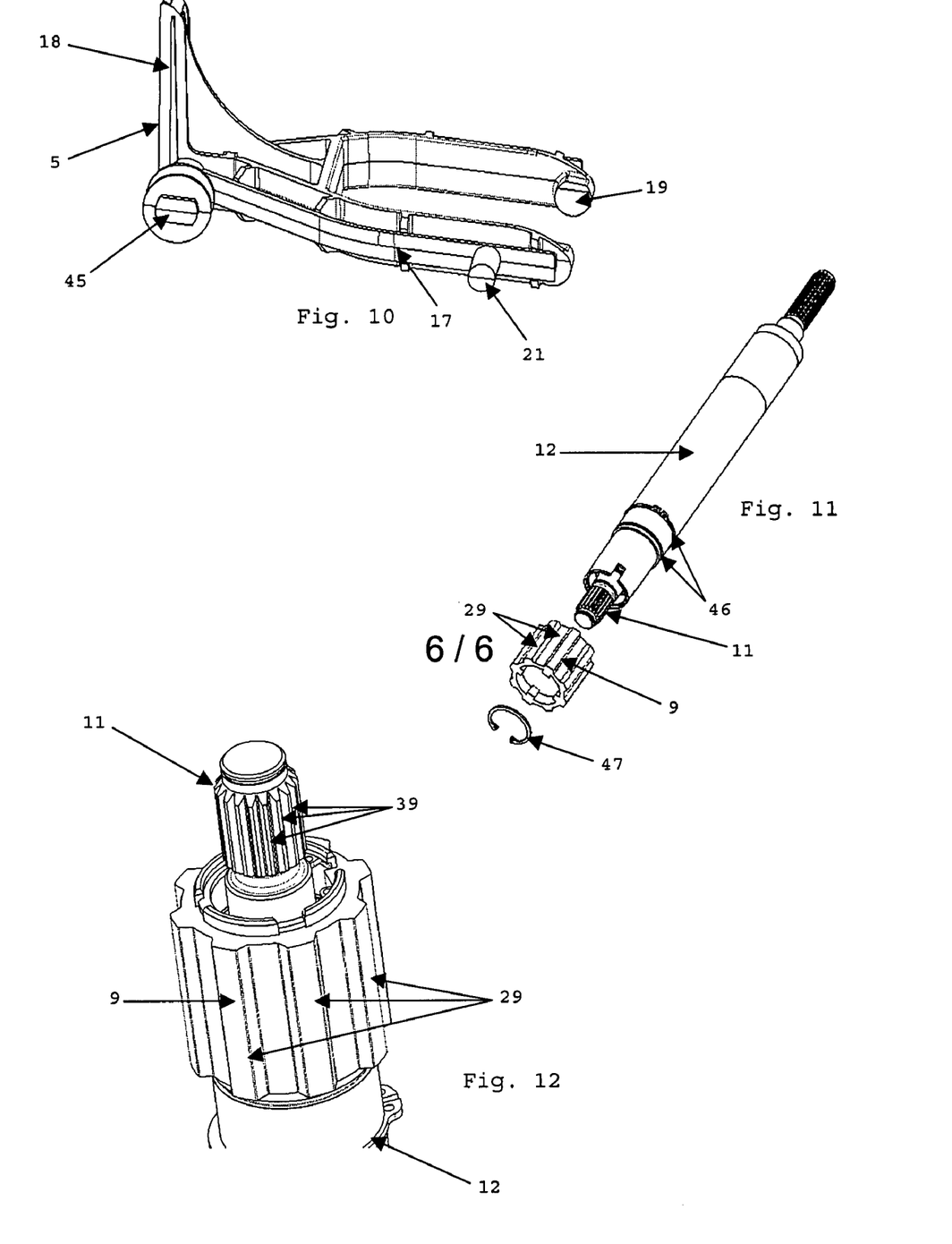
FIG. 10 is a left lateral view of the switching bracket of the present invention.
FIG. 11 is a conventional perspective view of the shaft and hollow shaft of the present invention.
FIG. 12 is a detailed front view of the shaft with the shaft insert of the present invention.

FIG. 10 is a detailed view of the bracket (5). The bracket will hold the support member (7) by means of the pivot (45), which are found in the intersection of the lever (18) and the arms (17). The arms (17) contain the terminals (19) that are found in contact with the groove (16) and the upper wall (30) of the mobile clutch (6). Additionally, the arms (17) contain the protuberance (21) over which the tappet (20) of the contact switch (4) will rest.

FIG. 11 shows the hollow shaft (12) that houses in its interior the shaft (11). The rotation of both shafts (11, 12) is independent amongst themselves. The hollow shaft (12) contains a plurality of splines (46). By means of the splines (46) and a safety catch (47), the insert (9) is joined to the hollow shaft (12).

The insert (9) contains a plurality of straight teeth splines (29), which will allow the connection with the internal part of the mobile clutch (6) and consequently the rotation of the hollow shaft (12), the rotation of the mobile clutch (6) and the rotation of the basket (41) in a dependent manner one from another.

FIG. 12 is a detailed view of the insert (9), the shaft (11) end and the hollow shaft (12) end. Specifically, it may be seen that the insert (9) is joined to the hollow shaft (12). Additionally, the plurality of straight teeth splines (29) of the insert (9) may be seen in detail.

In said figure, it may also be observed that the shaft (11) contains in its end a plurality of splines (39). The end of the shaft (11), will be connected to the internal part (38) of the pulley-clutch (13). The pulley-clutch (13) is moved by the belts (28) which are connected to the motor (27). Since the pulley-clutch (13) and the shaft (11) end are always fixed, the shaft (11) and the pulley-clutch, by means of the belts (28), rotate or oscillate the agitator or propeller (1).

Figure 13:
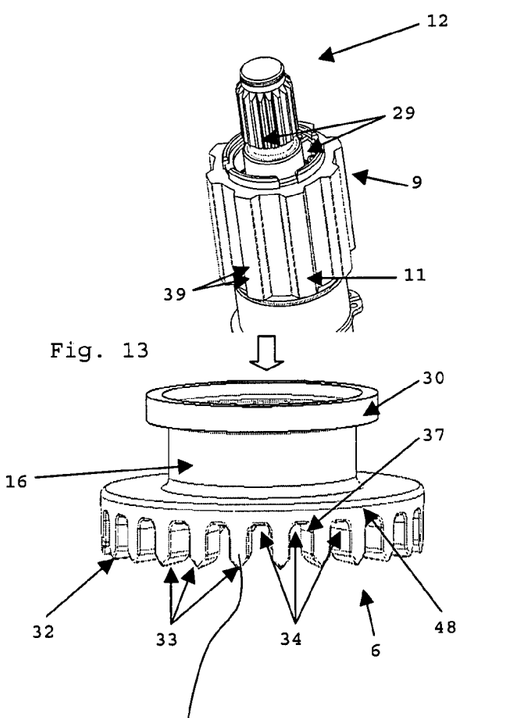
FIG. 13 is a front view of the mobile clutch of the present invention, the shaft and hollow shaft being engaged with the mobile clutch.

FIG. 13 is a detailed view of the mobile clutch (6) and it's joint with the insert (9). The internal part of the mobile clutch (6) is hollow, so that the insert (9), which is joined to the hollow shaft (12), guides the mobile clutch (6) by means of the plurality of straight teeth splines (29) in the exterior part of the insert, and a plurality of straight teeth splines in the interior part of the mobile clutch (6). The mobile clutch (6) is guided with the insert (9), by means of the straight teeth splines that the insert (9) has in its external part, as well as the straight teeth splines in the interior part of the mobile clutch (6), which coincide with the straight teeth splines (29) of the insert (9). Between the fixing member (23) and the mobile clutch (6), around the insert, a second spring (10) may be found, which pushes the mobile clutch (6) towards the pulley-clutch (13).

Since the shaft (11) end contains a smaller diameter to that of the hollow shaft (12) and a smaller diameter to that of the internal part of the mobile clutch (6), achieves going through the internal part of the mobile clutch (6), so that said shaft (11) joins with the pulley-clutch (13).

Figure 14:
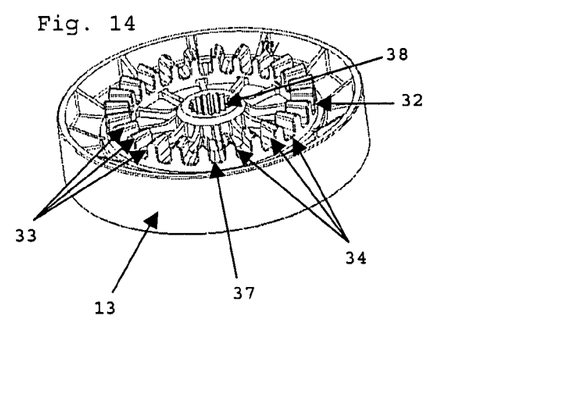
FIG. 14 is a perspective view of the pulley-clutch of the present invention.

FIG. 14 is a detailed view of the pulley-clutch (13). When the hollow shaft (12) is joined by means of the insert (9) to the mobile clutch (6), the shaft (11) end goes through the mobile clutch (6) since it has a smaller diameter than the insert (9) and the hollow shaft (12). Since the mobile clutch (6) and the pulley-clutch (13) are found in the same axis, the shaft (11) also coincides in the same axis as the pulley-clutch (13). The pulley-clutch (13) is coupled to the shaft (11) end, by means of splines (39) that the shaft (11) end has in its external part, as well as splines in the internal part (38) of the pulley-clutch (13), which coincide with the splines (39) of the shaft (11).

Figure 15:
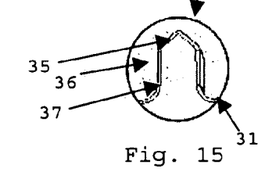
FIG. 15 is a detailed front view of a spline and groove of the clutches of the present invention.
Figure 16:
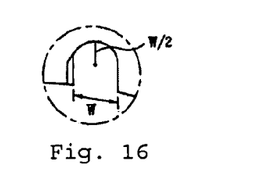
FIG. 16 is a detailed inferior front view of a first embodiment of a spline and groove of the clutches of the present invention.

FIGS. 15 and 16 show two embodiments of the teeth (33). The mobile clutch (6) and the pulley-clutch (13), have a coinciding axis. In view that the mobile clutch (6) descends with respect to the vertical plane when the actuator (3) is activated, the mobile clutch (6) contacts the pulley-clutch (13), which is fixed in the vertical plane.

During the time in which the mobile clutch (6) is being pushed, the engagement surfaces (32) of both clutches (6, 13) enter into contact. The engagement surface (32) of both clutches (6, 13), include a series of alternating teeth (33) and grooves (34), which are radially extended through said clutches (6, 13).

Preferably, as seen in FIG. 15, the form of the teeth (33) in the end part (35) of the clutches (6, 13) is triangularly formed with the end triangle tip being rounded or flat. The form of the internal part (36) of the teeth (33) of the clutches (6, 13) is a rectangular form. The end part (35) and the internal part (36) of the teeth (33) are the same piece. On the other hand, the grooves (34) of the clutches (6, 13) are rectangular, with exploded inner corners (37).

The teeth (33) of the clutch (6, 13) are similar to the opposed clutch (6, 13), whilst the clutch (6, 13) grooves (34) are similar to the opposed clutch (6, 13).

The number of teeth (33) in the internal diameter of the mobile clutch (6) is preferably greater to that known in the art, since it diminishes the level of system effort. The number of teeth (33) of the mobile clutch (6) coincides with the number of teeth (33) of the pulley-clutch (13).

However, the form of the teeth (33) and grooves (34) is not limited to the above-mentioned form. FIG. 16 shows an embodiment of the clutches (6, 13), wherein the teeth (33) are curved in their ends (35) whereas the internal part (36) are straight. Additionally, in this first embodiment the internal corners (37) of the grooves (34) are with straight angles. Preferably, in this first embodiment the sizes of the teeth (33) have a W longitude, and the total height of the teeth must be W.

When the engagement surfaces (32) enter in contact, the teeth (33) of the clutches (6, 13) start looking for the grooves of the opposite clutch (6, 13). Given the form of the teeth (33) of both clutches (6, 13), when the surface (32) of said teeth (33) of a clutch (6, 13) slides with regards to the teeth (33) of the other clutch (6, 13), therefore, the teeth of a first clutch (6, 13) finds the corresponding groove (34) of a second clutch (6, 13). The aforementioned may also be solved by a slight start of the motor. Additionally, the afore-mentioned may also be solved by the material in which the clutches (6, 13) are made, which may be auto-lubricant plastic.

Both clutches (6, 13) are coupled one to another.

In view of the coupling of the clutches (6, 13) the contact limit (4) switch (31) by means of the tappet (20), is activated by the protuberances (21) of the bracket (5), allowing the energizing the motor (27) for the respective cycle. Therefore, the actuator (3) piston (15) has reached the end of its run. The clutches (6, 13) maintain this position, since the actuator (3) will not move the piston (15) and will be pushing the lever (18) in the same position. Consequently, the arms (17) will be maintained in position in regards to the lever (18), the second spring (10) will be in its minimal effort state, the first spring (8) will be in its maximum effort state, and the mobile clutch (6) will be kept down, assuring the engagement between the mobile clutch (6) and the pulley-clutch (13).

Ended the respective process, that is, possibly a centrifuge, spray or similar process, the clutches (6, 13) must be disengaged.

Current stops circulating in the actuator (3) causing the introduction of the piston (15) to the actuator (3), retracting from its current position. Therefore, the piston (15) stops pushing the switching bracket (5) lever (18), allowing the arms (17), the terminals (19) and the protuberance (21) of the switching bracket (5), to ascend in a vertical plane. Said ascent of the switching bracket (5) parts, is achieved by means of the first spring (8), which even though the teeth (33) of the mobile clutch (6) are engaged to the teeth (33) of the pulley-clutch (13) and even though the ball bearing stalls the clutch (6, 13) teeth (33) and even though the second spring (10) is making a contrary force, the first spring (8) is capable of braking this contact and applying force over the switching bracket (5) translating into the vertical ascending movement of the mobile clutch (6) until a rest position of the first spring (8) is achieved.

When the arms (17) are raised, the mobile clutch (6) starts to ascend, given that the first spring (8) tends to rest and in view that the first spring (8) forces the second spring (10) and the clutch (6, 13) contact. When the first spring (8) is found in a minimal effort state, and when the actuator (3) piston (15) stops having contact with the switching bracket (5) lever (18), said mobile clutch (6) stops being raised. The clutches (6, 13) have been disengaged.

As was mentioned above, the actuator is preferably a thermo-actuator. The use of a thermo-actuator (3) conveys several advantages. Among them, the force and displacement transmission to push the switching bracket (5) and consequently the lever (18), arms (17), terminals (19) and protuberance (21). Additionally, the force transmitted by the thermo-actuator (3) beats the force of the first spring (8). The use cost of a thermo-actuator (3) is substantially less than the cost of a solenoid, commonly used for this situation. Additionally, the space occupied by said thermo-actuator (3) is substantially less than the space occupied by a solenoid. Furthermore, the thermo-actuator (3) has a stronger force than that of a solenoid, allowing a better and safer engagement of the clutches (6, 13).

Since the support member (7) in all of its parts is preferably a hard plastic, the actuator (3) may be coupled to said support member (7) without screws or similar, rather by bolts or housing (24) of the same support (7). An easy assembly is also allowed of the limit contact (4) and the switching bracket (5)

with the support member (7). The afore-mentioned, reduces the assembly cost, as well as the clutch system cost. Additionally, since the support member (7) is preferably made of plastic, the operation of said support member (7) is silent, allowing an easy, quick and trustworthy assembly, eliminating the bushings due to the auto-lubricant features of the material used.

Furthermore, preferably the clutches (6, 13) are also made of hard plastic. This gives a silent operation and allows the use of auto-lubricant materials, such as acetal, to smoothen the sliding between the clutch (6, 13) teeth (33).

Furthermore, preferably the switching bracket (5) is also made of a hard plastic. This gives as advantages an easy and quick assembly with the support member (7) by means of the second cover (25) and the support member (7). Additionally, it allows a silent operation and the use of auto-lubricant materials.

In combination with the afore-mentioned figures, the clutch functioning operation method of the present invention will now be described. When the clutches (6, 13) are disengaged, the washing machine is found in an agitation phase.

The motor (27), through the belt (28) and the pulleys, transmits power to the pulley-clutch (13). The movement transmitted by the motor is alternating, that is, clockwise (CW) and counter-clockwise (CCW) to create agitation.

The pulley-clutch (13) contains a fixed connection with the shaft (11), by means of the internal part (38) of the pulley-clutch (13). This fixed connection, is achieved by a series of splines (39) contained in said internal part (38) of the pulley-clutch (13) and the shaft (11) end. The splines (39) of the internal part (38) of the pulley-clutch (13), coincide with the splines (39) of the shaft (11) end.

Furthermore, the shaft (11) is connected directly to the propeller or agitator (1), therefore the power transmission falls directly to the propeller or agitator (1), generating a concentric circular movement in both senses to the water and textile means. Due to the friction between the water and textiles means with the basket (41), when the system rotates CCW, the movement applied to the propeller or agitator (1) is transmitted to the basket (41) at certain level, through the water and textile means, making that the basket (41) as well as its content, move in the same rotation sense however at different angular speeds. When the movement is CW, the basket (41) and the water and textile means do not have relative movement, since the ball bearings block the movement action of the basket (41). Therefore, the movement is transmitted to the propeller or agitator (1) and at the same time, to the water and textiles, improving the washing efficiency of the system.

Once the washing cycle is finished, the liquid draining action is activated, draining the liquid within the tub (40). The liquid draining time is configured in the washing machine temporizer.

When the draining time starts, the actuator (3) is activated. The actuator (3) activation time is less than the configured draining time, thus assuring that the actuator (3) is completely energized and the piston (15) in its final position prior to centrifuge phase. When the actuator (3) is activated, the piston (15) pushes the switching bracket (5) lever (18) in a lever angular displacement.

The piston (15) movement, causes the lever angular displacement (18, 17) causing the axial displacement of the mobile clutch (6) which is already being pushed by the second spring (10), guided by the geometry between the terminals (19) and the arms (17), the groove (16) of the mobile clutch (6) and the straight teeth spline (29) of the insert (9).

When the actuator (3) piston (15) has reached the end of the run, and thus the switching bracket (5) and respective components have terminated its vertical movement, an equilibrium point between the first spring (8) and the actuator (3) force is reached, thus achieving engagement of the system.

The teeth (33) of both clutches (6, 13) are engaged and coupled.

When the centrifugal mode starts, the motor (27) transmits power to the pulley-clutch (13) through the respective belt (28), in a CCW sense, taking into account that the observer is found in an upper position in regards to the washing machine.

The pulley-clutch (13) and shaft (11), transmit power to the agitator or propeller (1). Additionally, the pulley-clutch (13) transmits this power towards the hollow shaft (12), since the pulley-clutch (13) is engaged with the mobile clutch (6), wherein the mobile clutch (6) by means of the straight teeth splines in its inner part, is connected to the straight teeth splines (29) of the hollow shaft (12) insert (9). The hollow shaft (12) insert, is coupled to the basket (41) through the bottom (2) of the basket (41), thus the complete basket (41) rotates to produce the water and textile means centrifuge. Additionally, the agitator or propeller (1) also rotates in the same sense as the basket (41), and consequently the agitator or propeller (1) is moved in the same rotation sense and same angular speed.

Once centrifuge phase has finished, the rinse phase starts, which may be a repetition of the agitation phase if it is a deep rinse, or a spraying phase, if it is a spray rinse. If it is a deep rinse, the actuator (3) has to be de-energized, so that the mobile clutch (6) and the first spring (8) return to their original rest position. The first spring (8) is capable of braking contact of both clutches (6, 13) and exercising force on the switching bracket (5) translating to an axial movement of the mobile clutch (6) to achieve the first spring (8) rest position. If it is a spray rinse, the clutches (6, 13) may remain coupled.

Alterations of the disclosed structure in the present, may be seen by those skilled in the art. However, it must be understood that the present description is related to the preferred embodiments of the invention, which is only for illustrative purposes and must not be construed as a limitation of the invention. All the embodiments that do not depart from the spirit of the invention will be included within the following claim breadth.

What we claim is:

1. A washing machine clutch system to rotate or oscillate an agitator or propeller and selectively rotate a basket, the clutch system comprising:

a support member that includes a housing and a cover;

an actuator comprising a piston, the actuator disposed in the housing of the support member, wherein the piston travels between a retracted position and an extended position;

a bracket comprising a lever coupled to at least one arm including at least one terminal and at least one protuberance, configured to move between an engaged position and a disengaged position, and to be in an engaged position when the piston is in a fully extended position;

a first spring connected in tension from the support member to the bracket and constantly urging the bracket into a disengaged position;

a hollow shaft and a shaft, both shafts being arranged to rotate;

a mobile clutch configured to move with the bracket between an engaged position and a disengaged position, comprising an annular groove bounded by an upper wall and a lower wall and open on a radially outward side, and an internal part, wherein said at least one terminal rests in the groove, wherein the lower wall comprises a plurality of alternating teeth and grooves and wherein the mobile clutch is coupled to the hollow shaft by way of the internal part;

a pulley-clutch comprising a plurality of alternating teeth and grooves, and an internal part, wherein the pulley-clutch is coupled to the shaft by way of said pulley-clutch internal part;

wherein the mobile clutch is coupled with the pulley-clutch when the bracket is in an engaged position, and is uncoupled from the pulley-clutch when the bracket is in the disengaged position.

2. The clutch system according to claim 1, further comprising an insert and a second spring, wherein the insert is coupled to the hollow shaft to couple the mobile clutch to the hollow shaft, and the second spring is arranged to urge the mobile clutch to an engaged position, and further wherein the second spring surrounds the insert.

3. The clutch system according to claim 1, further comprising a contact limit coupled to the support member, and wherein the limit contact comprises a tappet and a switch.

4. The clutch system according to claim 1, wherein the pulley-clutch is connected to a belt, wherein the belt is connected to a drive system that includes a motor and at least one pulley.

5. The clutch system according to claim 2, wherein the mobile clutch, the pulley-clutch, the hollow shaft and the shaft share a common axis, wherein the shaft is disposed within the hollow shaft, wherein the insert is coupled to the hollow shaft by way of a plurality of splines and a safety, and wherein the insert comprises a plurality of generally straight teeth splines and the mobile clutch internal part comprises a plurality of generally straight teeth splines arranged to couple the mobile clutch with the hollow shaft.

6. The clutch system according to claim 1, wherein an end portion of the shaft comprises a plurality of splines and the pulley-clutch internal part comprises a plurality of splines to couple the pulley-clutch with the shaft.

7. The clutch system according to claim 1, wherein the plurality of teeth and grooves of the mobile clutch are arranged in a lower part of the lower wall, wherein an upper part of the teeth is configured in a rounded triangular shape and a lower part is configured in a rectangular shape with exploded inner corners or wherein the upper part of the teeth is configured in a flat triangular shape and the lower part is configured in a rectangular shape with exploded inner corners or wherein the upper part of the teeth is rounded and the lower part is flat or wherein the inner corner of the grooves defines at least one rectangular angle.

8. An automatic washing machine that comprises the clutch system of claim 1.

* * * * *